US011822499B1

(12) United States Patent
Lee et al.

(10) Patent No.: US 11,822,499 B1
(45) Date of Patent: Nov. 21, 2023

(54) DYNAMIC SLOT MAPPING

(71) Applicant: Dell Products L.P., Round Rock, TX (US)

(72) Inventors: Chien-Lin Lee, Round Rock, TX (US); Jon Vernon Franklin, Pflugerville, TX (US); Venkatesh Ramamoorthy, Round Rock, TX (US); Jun Gu, Austin, TX (US); Robert T. Stevens, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/731,078

(22) Filed: Apr. 27, 2022

(51) Int. Cl.
*G06F 13/40* (2006.01)
*G06F 13/42* (2006.01)
*G06F 13/38* (2006.01)

(52) U.S. Cl.
CPC ........ *G06F 13/4022* (2013.01); *G06F 13/385* (2013.01); *G06F 13/4282* (2013.01); *G06F 2213/0016* (2013.01); *G06F 2213/0026* (2013.01); *G06F 2213/3808* (2013.01)

(58) Field of Classification Search
None
See application file for complete search history.

(56) References Cited

U.S. PATENT DOCUMENTS

| | | | | |
|---|---|---|---|---|
| 10,148,746 B2 * | 12/2018 | Itkin | ...................... | H04L 67/104 |
| 10,430,351 B2 * | 10/2019 | Gupta | ...................... | G06F 13/20 |
| 11,641,407 B2 * | 5/2023 | Shah | ...................... | H04L 67/34 |
| | | | | 709/221 |
| 2010/0333101 A1 * | 12/2010 | Pope | ...................... | H04L 47/10 |
| | | | | 718/103 |
| 2013/0326039 A1 * | 12/2013 | Shah | ...................... | H04L 41/04 |
| | | | | 709/223 |
| 2015/0205746 A1 * | 7/2015 | Bailey | ................. | G06F 13/4027 |
| | | | | 710/315 |
| 2016/0248619 A1 * | 8/2016 | Itkin | ...................... | H04L 45/74 |
| 2018/0309668 A1 * | 10/2018 | Stevens | ................... | H04L 69/22 |
| 2019/0303335 A1 * | 10/2019 | Remis | ................. | G06F 13/4068 |
| 2020/0136901 A1 * | 4/2020 | Ballard | ............... | H04L 12/4625 |
| 2022/0066895 A1 * | 3/2022 | Itkin | .................... | G06F 13/4063 |
| 2022/0210229 A1 * | 6/2022 | Maddukuri | ........... | G06F 9/3877 |
| 2022/0350765 A1 * | 11/2022 | Ballard | ................. | H04L 9/3213 |

\* cited by examiner

*Primary Examiner* — Henry Tsai
*Assistant Examiner* — Aurangzeb Hassan
(74) *Attorney, Agent, or Firm* — Jackson Walker L.L.P.

(57) ABSTRACT

An information handling system may include a management controller and information handling resources that are coupled to the management controller via a first communication channel and a second communication channel, each information handling resource having a first communication channel identifier, and each information handling resource having a second communication channel identifier. The management controller may query the information handling resources via the first communication channel to determine a first set of unique identifiers for the information handling resources; query the information handling resources via the second communication channel to determine a second set of unique identifiers for the information handling resources; and based on a comparison between the first set of unique identifiers and the second set of unique identifiers, create a mapping that correlates the first communication channel identifiers with the second communication channel identifiers.

15 Claims, 4 Drawing Sheets

DYNAMIC SLOT MAPPING

TECHNICAL FIELD

The present disclosure relates in general to information handling systems, and more particularly to methods and systems for mapping communication channel information to a slot in which an information handling resource is installed.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators, smart devices, and other information handling resources may benefit from the teachings of this disclosure.

A SmartNIC may act as a system within a system, including its own Unified Extensible Firmware Interface Basic Input/Output System (UEFI BIOS), its own operating system (OS) such as ESXio or any other suitable OS, and/or its own management controller such as a SmartNIC baseboard management controller (BMC).

For the sake of clarity and concreteness, the SmartNIC example will be discussed in detail herein, but one of ordinary skill in the art with the benefit of this disclosure will understand its application to other devices. In general, embodiments of this disclosure may be applicable to any information handling resource that is coupled to an information handling system via multiple communication paths.

In some situations, an information handling resource such as a SmartNIC may be communicatively coupled to an information handling system via multiple paths. For example, a device may be inserted in a Peripheral Component Interconnect Express (PCIe) slot, but it may also have one or more separate cables connecting it to other components. In some situations it may be difficult to determine a mapping between such connections, and so a change in cabling or slot may cause misconfiguration errors.

Accordingly, embodiments may provide techniques for creating a mapping among multiple communication paths that is resilient even when physical connectivity changes take place.

It is to be noted that various elements discussed herein are described in the network controller sideband interface (NC-SI) Specification 1.1.1 released May 25, 2021 (hereinafter, NC-SI Specification), which is incorporated by reference in its entirety. One of ordinary skill in the art with the benefit of this disclosure will understand its applicability to other specifications (e.g., prior or successor versions of the NC-SI Specification). Further, some embodiments may be applicable to different technologies other than NC-SI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with mapping communication channel information to slot information may be reduced or eliminated.

In accordance with embodiments of the present disclosure, an information handling system may include a management controller and information handling resources that are coupled to the management controller via a first communication channel and a second communication channel, each information handling resource having a first communication channel identifier, and each information handling resource having a second communication channel identifier. The management controller may query the information handling resources via the first communication channel to determine a first set of unique identifiers for the information handling resources; query the information handling resources via the second communication channel to determine a second set of unique identifiers for the information handling resources; and based on a comparison between the first set of unique identifiers and the second set of unique identifiers, create a mapping that correlates the first communication channel identifiers with the second communication channel identifiers.

In accordance with these and other embodiments of the present disclosure, a method may include, in an information handling system including a management controller configured to provide out-of-band management of the information handling system, and a plurality of information handling resources that are each communicatively coupled to the management controller via a first communication channel and a second communication channel, each information handling resource having a first communication channel identifier associated with the first communication channel, and each information handling resource having a second communication channel identifier associated with the second communication channel; the management controller querying the information handling resources via the first communication channel to determine a first set of unique identifiers for the information handling resources; the management controller querying the information handling resources via the second communication channel to determine a second set of unique identifiers for the information handling resources; and based on a comparison between the first set of unique identifiers and the second set of unique identifiers, the management controller creating a mapping that correlates the first communication channel identifiers with the second communication channel identifiers.

In accordance with these and other embodiments of the present disclosure, an article of manufacture may include a non-transitory, computer-readable medium having instructions thereon that are executable by at least one processor of a management controller of an information handling system that includes a plurality of information handling resources that are each communicatively coupled to the management controller via a first communication channel and a second communication channel, each information handling resource having a first communication channel identifier associated with the first communication channel, and each information handling resource having a second communication channel identifier associated with the second communication channel, the instructions being executable for: querying the information handling resources via the first communication channel to determine a first set of unique identifiers for the information handling resources; querying the information handling resources via the second communication channel to determine a second set of unique identifiers for the information handling resources; and based on a comparison between the first set of unique identifiers and the second set of unique identifiers, creating a mapping that correlates the first communication channel identifiers with the second communication channel identifiers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
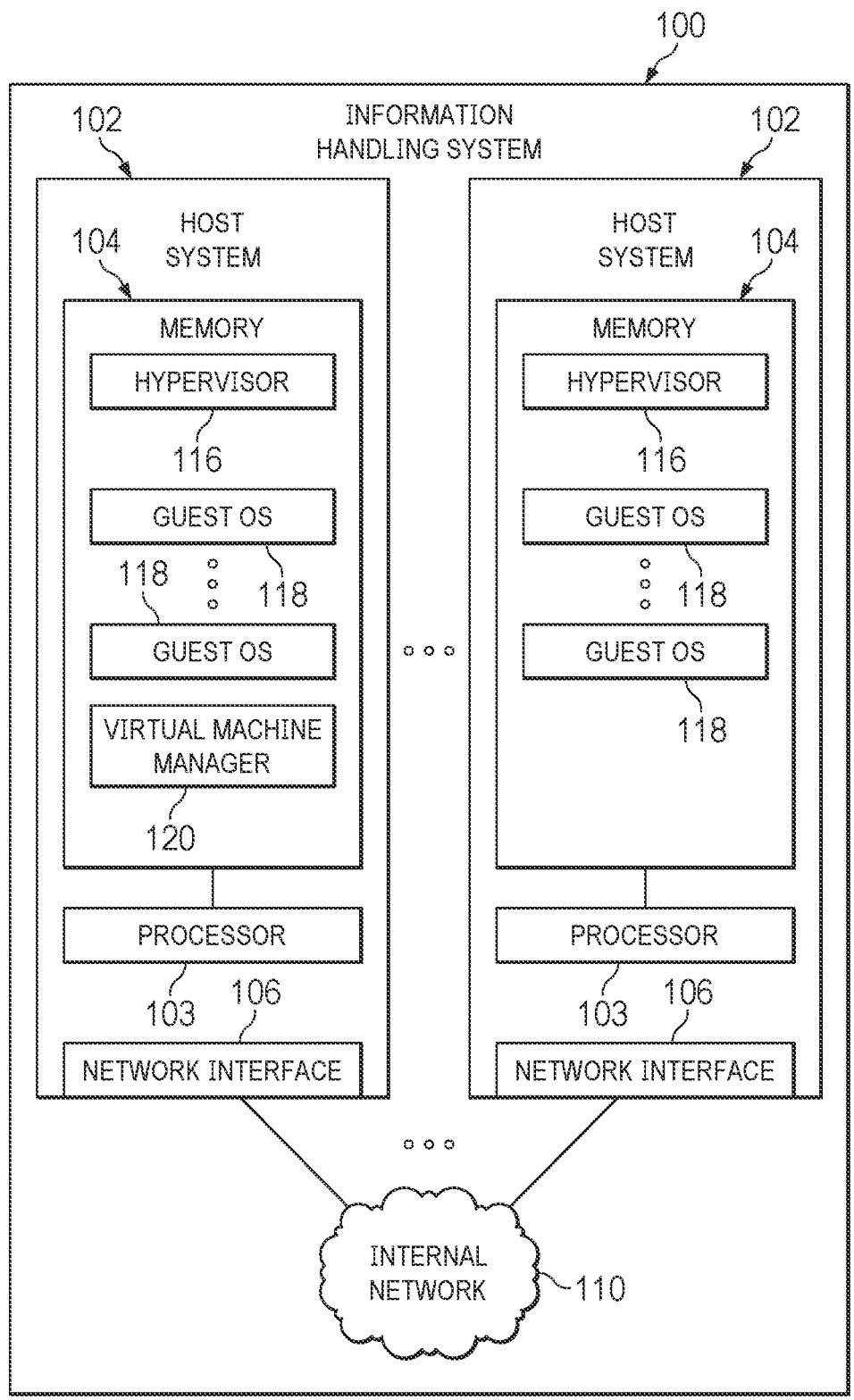
FIG. 1 illustrates a block diagram of selected components of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may allow for a robust mapping of communication channels when an information handling resource is coupled to a system via more than one such channel.

Figure 2:
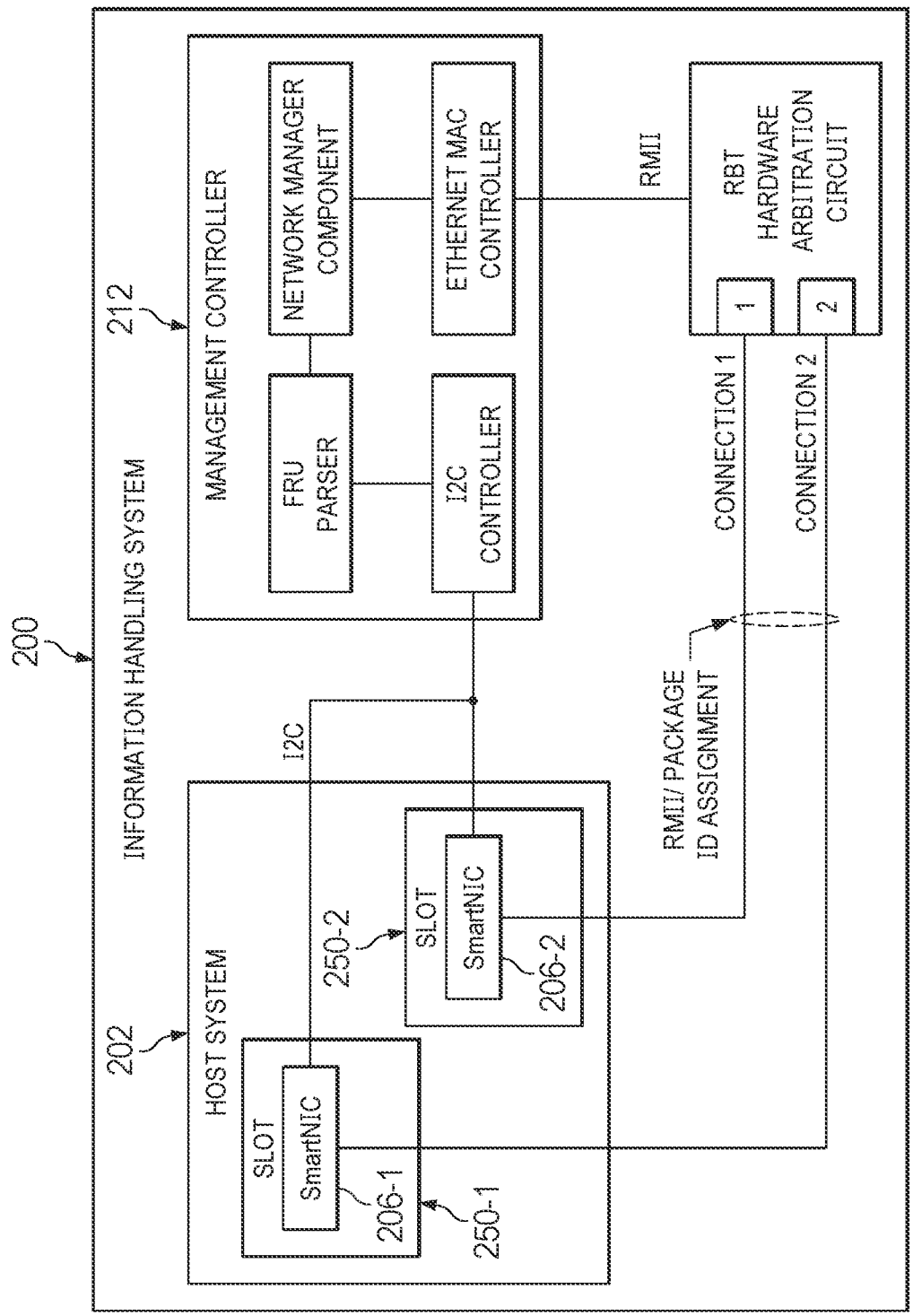
FIG. 2 illustrates a block diagram of selected components of an example information handling system, in accordance with embodiments of the present disclosure.

Turning now to FIG. 2, an example information handling system 200 is shown. Host system 202 includes slots (e.g., PCIe slots) 250-1 and 250-2 (collectively, slots 250). SmartNICs 206-1 and 206-2 (collectively, SmartNICs 206) are inserted into slots 250. Management controller 212 may be coupled to SmartNICs 206 via a network controller sideband interface (NC-SI), which may be established over reduced media-independent interface (RMII) based transport (RBT). As shown, this interface may also include an RBT hardware arbitration circuit, which may allow multiple SmartNICs 206 to couple to the RMII interface of management controller 212. SmartNICs 206 may also be coupled to management controller 212 via an Inter-Integrated Circuit (I²C) interface, which may be embedded in the PCIe connection in some embodiments. Although only two slots 250 and two SmartNICs 206 are shown, in other implementations, any desired number of such components may be present.

SmartNICs 206 may physically be installed in any supported slot 250. Further, the cabling between the RBT hardware arbitration circuit and SmartNICs 206 may also be rearranged (e.g., connection 1 may be attached to SmartNIC 206-2, etc.).

In this embodiment, the RBT hardware arbitration circuit provides unique connection identity signals on the NC-SI cable to set the Package ID of the NC-SI device. Accordingly, the way in which the NC-SI cables are connected to SmartNICs 206-1 and 206-2 may determine the Package IDs used by each in NC-SI communication.

In particular, the PCIe slot identifier for a particular SmartNIC 206 is determined by the riser that it is plugged into, and the Package ID is determined by the NC-SI cable connection. No PCIe slot information may be available from the NC-SI device. Accordingly, if a particular SmartNIC stays in the same slot, but its NC-SI cable connection is changed, the NC-SI Package ID mapping to the PCIe slot will be changed.

Figure 3A:
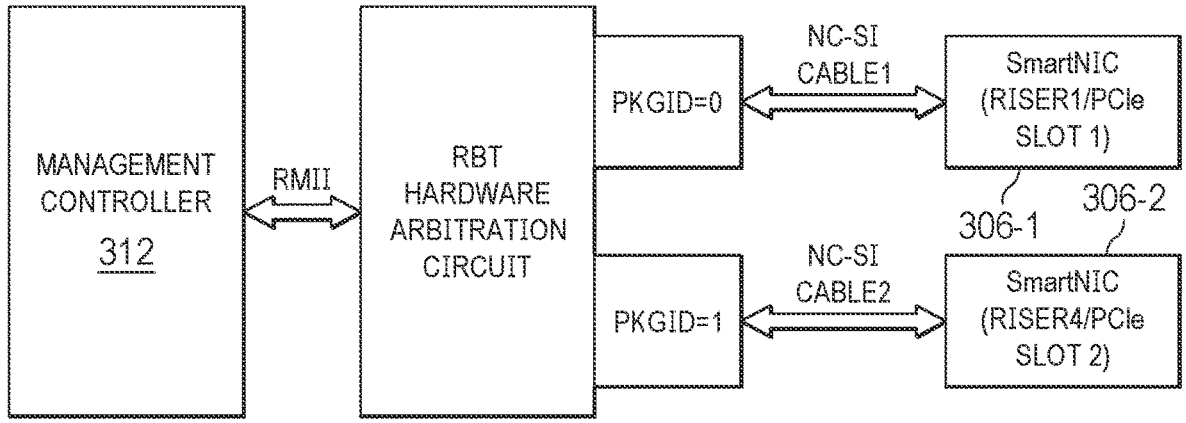
FIGS. 3A and 3B illustrate block diagrams of selected components of an example information handling system, in accordance with embodiments of the present disclosure.
Figure 3B:
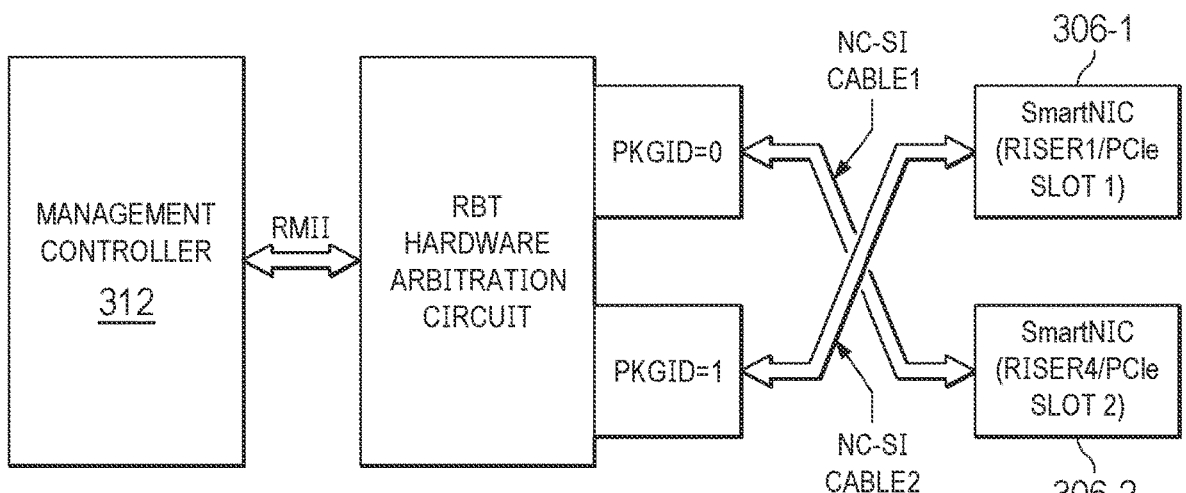

Turning briefly now to FIGS. 3A and 3B, this problem is illustrated. In FIG. 3A, SmartNIC 306-1 has Package ID 0, and SmartNIC 306-2 has Package ID 1. In FIG. 3B, the NC-SI cabling has been reversed, and the Package IDs have been swapped. Management controller 312 may experience a Package ID mismatch and/or a swapped in the fully qualified domain descriptors (FQDDs) if a static mapping is used based on the order of Package IDs.

Returning now to FIG. 2, embodiments of this disclosure address the problem illustrated in FIGS. 3A and 3B. That is, with no existing method for obtaining a direct mapping between the NC-SI Package ID and the PCIe slot, management controller 212 may be configured as described herein to create a dynamic mapping to prevent users from seeing incorrect PCIe slot information associated with a given SmartNIC.

In particular, embodiments may allow for multiple SmartNICs 206 to be installed in information handling system 200 without any restriction on which slots 250 are to be used or on which cable connections to the RBT hardware arbitration circuit are to be used. This may simplify assembly in the factory and reduce the chances of misconfiguration, as well as allowing for changes to be made easily in the field.

In general, management controller 212 may identify each NC-SI channel (e.g., each network port) with an FQDD. Such identification may be constructed in a format such as: NIC.Slot.<PCIe Slot Number>—<Port Number>—<Partition>

Embodiments may be employed in the SmartNIC context, or to any information handling resource that uses a cabled RBT interface, or to information handling resources that use other interfaces, as appropriate.

In one embodiment, an information handling resource in a known slot may contain identifying information with a unique identifier that can be read by management controller 212 over the $I^2C$ bus (e.g., by using a field replaceable unit (FRU)). In the SmartNIC example, the unique identifier may be a media access control (MAC) address. In other situations, other types of unique identifiers may be used, such as globally unique identifiers (GUIDs), universally unique identifiers (UUIDs), etc. If the information handling resource does not have a suitable unique identifier, it may be configured to generate one. Management controller 212 may also read the identifier value from the information handling resource over RBT by using NC-SI commands.

By correlating the unique identifier that was read over the $I^2C$ bus and the unique identifier that was read over RBT, management controller 212 may associate the NC-SI connection with the correct slot.

In one implementation, a SmartNIC may create a unique identifier in the SmartNIC FRU which is readable by both $I^2C$ and NC-SI. The management controller may then access the unique identifier through both communication channels. For example, the management controller may read all PCIe adapter FRUs, and collect the unique identifiers for any SmartNICs. The management controller may further query the unique identifier via NC-SI command.

The management controller may then compare the results. If the unique identifier is matched, then the slot number portion of the FQDD may be correctly assigned, and the channel and partition portions of the FQDD may remain unchanged.

Figure 4:
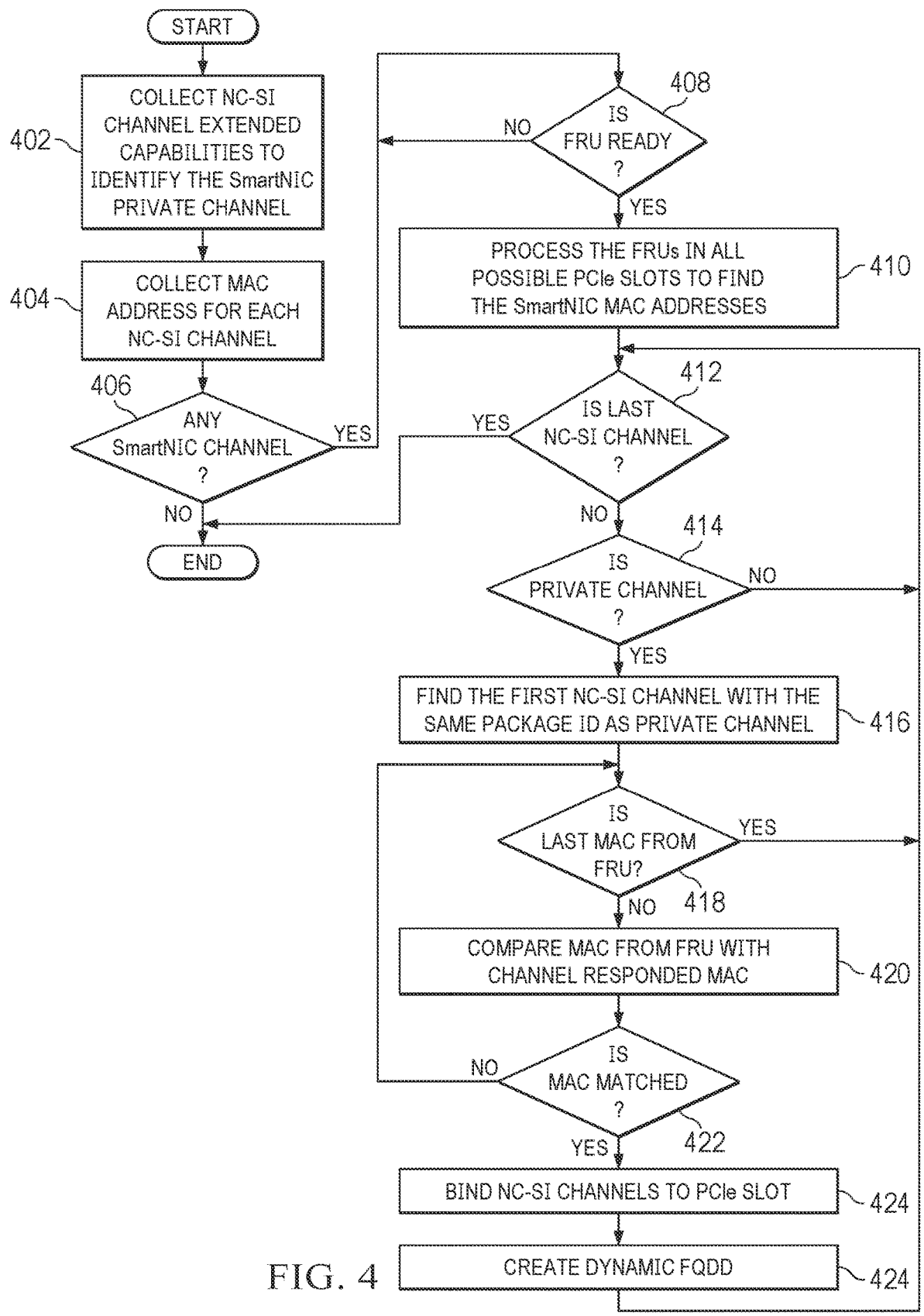
FIG. 4 illustrates an example method, in accordance with embodiments of the present disclosure.

Turning now to FIG. 4, an example method 400 for creating a dynamic FQDD for an information handling resource is shown, according to some embodiments.

At step 402, the management controller may send a command (e.g., an NC-SI OEM command) to all NC-SI channels on the RMII bus. This command may be used to identify the SmartNIC private channel.

At step 404, the management controller may send another command (e.g., a different NC-SI OEM command) to all NC-SI channels on the RMII bus to collect the MAC addresses that are used as unique identifiers in this implementation.

If any NC-SI channel is identified as a SmartNIC private channel at step 406, the management controller starts the dynamic mapping process. The management controller may wait for the SmartNIC's FRU to become ready at step 408, and then at step 410 it may look through all FRUs in all possible PCIe slots to find the SmartNIC-type FRUs. The management controller may then parse information from each SmartNIC FRU and collect the MAC address as the unique identifier.

The management controller may loop through all NC-SI channels to find the SmartNIC private channel, using the channel ID of the private channel to locate the first channel associated with the SmartNIC's Package ID.

At steps 418 through 422, the management controller may then use that first channel's MAC address to compare with all collected MAC addresses from the FRUs, looping until a match is found.

If the management controller finds a match, it may group all NC-SI channels with the same Package ID and bind those NC-SI channels to that PCIe slot with the matched MAC address at step 424. The management controller may then create a dynamic FQDD for the device, and update attributes for other components based on the new FQDD. As shown, the method may then loop to repeat the same process for all SmartNIC private channels.

Further, method 400 may be repeated periodically (e.g., at every system boot or at other designated times) in order to update the dynamic FQDDs.

One of ordinary skill in the art with the benefit of this disclosure will understand that the preferred initialization point for the method depicted in FIG. 4 and the order of the steps comprising that method may depend on the implementation chosen. In these and other embodiments, this method may be implemented as hardware, firmware, software, applications, functions, libraries, or other instructions. Further, although FIG. 4 discloses a particular number of steps to be taken with respect to the disclosed method, the method may be executed with greater or fewer steps than depicted. The method may be implemented using any of the various components disclosed herein, and/or any other system operable to implement the method.

Accordingly, embodiments of this disclosure may provide many benefits. A dynamic FQDD may be created based on a match of the same unique identifier that is read from the adapter via the FRU and read from the NC-SI channel. In this way, a system may be assembled with no restriction on how cables are connected or how NC-SI hardware arbitration works. This provides flexibility for the factory installation process, and the number of unique cables can be reduced for cost efficiency. The solution may also support future platform configurations, where the cable-connected devices can be plugged into any slot.

This may reduce complexity and confusion, as dependencies on slot installation and cable selection are reduced or eliminated. Embodiments may be implemented in a generic, vendor-independent fashion.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a management controller configured to provide out-of-band management of the information handling system; and
   a plurality of information handling resources that are each communicatively coupled to the management controller via a first communication channel and a second communication channel, each information handling resource having a first communication channel identifier associated with the first communication channel, and each information handling resource having a second communication channel identifier associated with the second communication channel, wherein the information handling resources are selected from the group consisting of network interface controllers (NICs) and SmartNICs;
   wherein the management controller is configured to:
   query the information handling resources via the first communication channel to determine a first set of unique identifiers for the information handling resources;
   query the information handling resources via the second communication channel to determine a second set of unique identifiers for the information handling resources; and
   based on a comparison between the first set of unique identifiers and the second set of unique identifiers, create a mapping that correlates the first communication channel identifiers with the second communication channel identifiers.

2. The information handling system of claim 1, wherein the first communication channel is a network controller sideband interface (NC-SI) channel.

3. The information handling system of claim 2, wherein the NC-SI channel is accessible via a reduced media-independent interface (RMII).

4. The information handling system of claim 1, wherein the second communication channel is an Inter-Integrated Circuit ($I^2C$) bus of a Peripheral Component Interconnect Express (PCIe) interface.

5. The information handling system of claim 1, wherein the management controller is further configured to create dynamic fully qualified device descriptors (FQDDs) for each information handling resource.

6. A method comprising, in an information handling system including a management controller configured to provide out-of-band management of the information handling system, and a plurality of information handling resources that are each communicatively coupled to the management controller via a first communication channel and a second communication channel, each information handling resource having a first communication channel identifier associated with the first communication channel, and each information handling resource having a second communication channel identifier associated with the second communication channel, wherein the information handling resources are selected from the group consisting of network interface controllers (NICs) and SmartNICs;
   the management controller querying the information handling resources via the first communication channel to determine a first set of unique identifiers for the information handling resources;
   the management controller querying the information handling resources via the second communication channel to determine a second set of unique identifiers for the information handling resources; and
   based on a comparison between the first set of unique identifiers and the second set of unique identifiers, the management controller creating a mapping that correlates the first communication channel identifiers with the second communication channel identifiers.

7. The method of claim 6, wherein the first communication channel is a network controller sideband interface (NC-SI) channel.

8. The method of claim 7, wherein the NC-SI channel is accessible via a reduced media-independent interface (RMII).

9. The method of claim 6, wherein the second communication channel is an Inter-Integrated Circuit ($I^2C$) bus of a Peripheral Component Interconnect Express (PCIe) interface.

10. The method of claim 6, further comprising:
    the management controller creating dynamic fully qualified device descriptors (FQDDs) for each information handling resource.

11. An article of manufacture comprising a non-transitory, computer-readable medium having instructions thereon that are executable by at least one processor of a management controller of an information handling system that includes a plurality of information handling resources that are each communicatively coupled to the management controller via a first communication channel and a second communication channel, each information handling resource having a first communication channel identifier associated with the first communication channel, and each information handling resource having a second communication channel identifier associated with the second communication channel, wherein the information handling resources are selected from the group consisting of network interface controllers (NICs) and SmartNICs, the instructions being executable for:
    querying the information handling resources via the first communication channel to determine a first set of unique identifiers for the information handling resources;
    querying the information handling resources via the second communication channel to determine a second set of unique identifiers for the information handling resources; and based on a comparison between the first set of unique identifiers and the second set of unique identifiers, creating a mapping that correlates the first communication channel identifiers with the second communication channel identifiers.

12. The article of claim 11, wherein the first communication channel is a network controller sideband interface (NC-SI) channel.

13. The article of claim 12, wherein the NC-SI channel is accessible via a reduced media-independent interface (RMII).

14. The article of claim 11, wherein the second communication channel is an Inter-Integrated Circuit (I²C) bus of a Peripheral Component Interconnect Express (PCIe) interface.

15. The article of claim 11, wherein the instructions are further executable for creating dynamic fully qualified device descriptors (FQDDs) for each information handling resource.

* * * * *